(12) United States Patent
Nanda et al.

(10) Patent No.: US 7,188,270 B1
(45) Date of Patent: Mar. 6, 2007

(54) METHOD AND SYSTEM FOR A DISK FAULT TOLERANCE IN A DISK ARRAY USING ROTATING PARITY

(75) Inventors: Sanjeeb Nanda, Winter Springs, FL (US); Tommy Robert Treadway, Winter Springs, FL (US)

(73) Assignee: Adaptec, Inc., Milpitas, CA (US)

( * ) Notice: Subject to any disclaimer, the term of this patent is extended or adjusted under 35 U.S.C. 154(b) by 360 days.

(21) Appl. No.: 10/300,981

(22) Filed: Nov. 21, 2002

(51) Int. Cl.
*G06F 11/00* (2006.01)

(52) U.S. Cl. .......................... 714/6; 714/701; 714/770; 714/805; 711/114

(58) Field of Classification Search ................. 714/800
See application file for complete search history.

(56) References Cited

U.S. PATENT DOCUMENTS

| | | | |
|---|---|---|---|
| 5,499,253 A | | 3/1996 | Lary |
| 5,513,192 A | * | 4/1996 | Janku et al. ................. 714/804 |
| 5,774,643 A | * | 6/1998 | Lubbers et al. ............... 714/20 |
| 5,790,774 A | | 8/1998 | Sarkozy |
| 5,805,788 A | | 9/1998 | Johnson |
| 5,860,091 A | * | 1/1999 | DeKoning et al. .......... 711/114 |
| 6,000,010 A | | 12/1999 | Legg |
| 6,148,430 A | | 11/2000 | Weng |
| 6,158,017 A | * | 12/2000 | Han et al. ....................... 714/6 |
| 6,304,942 B1 | * | 10/2001 | DeKoning ................... 711/114 |
| 6,327,672 B1 | | 12/2001 | Wilner |
| 6,353,895 B1 | | 3/2002 | Stephenson |
| 6,453,428 B1 | | 9/2002 | Stephenson |
| 6,748,488 B2 | * | 6/2004 | Byrd et al. .................. 711/114 |
| 6,871,317 B1 | * | 3/2005 | Corbett ........................ 714/800 |

* cited by examiner

*Primary Examiner*—Albert Decady
*Assistant Examiner*—Steve Nguyen
(74) *Attorney, Agent, or Firm*—W. David Sartor; Beusse Wolter Sanks Mora & Maire, P.A.

(57) ABSTRACT

A two-dimensional parity method and system for rotating parity information in a disk array, such as a RAID, to provide multiple disk fault tolerance with reduced write bottlenecks, is presented. The method includes forming a plurality of blocks, each block comprising a plurality of stripes extending across multiple disks, reserving at least one stripe in each block for parity, dividing each block into a plurality of chunks, wherein at least one of the chunks in the block comprises parity information, and shifting the position of each parity chunk in each block to a different disk with respect to the parity chunk in adjacent blocks. The method further includes shifting the position of each parity strip in the at least one stripe in each block to a different disk with respect to the parity chunk in adjacent blocks. A system for translating information in a disk array includes an array controller configured to shift parity chunks and parity strips.

17 Claims, 7 Drawing Sheets

Disks

| $S_{1,1}$ | $S_{1,2}$ | $S_{1,3}$ | $S_{1,4}$ | .. | ... | $S_{1,N-2}$ | $S_{1,N-1}$ | $S_{1,N}$ | $hP_1$ | $dP_1$ |
|---|---|---|---|---|---|---|---|---|---|---|
| $S_{2,1}$ | $S_{2,2}$ | $S_{2,3}$ | $S_{2,4}$ | . | ... | $S_{2,N-2}$ | $S_{2,N-1}$ | $S_{2,N}$ | $hP_2$ | $dP_2$ |
| $S_{3,1}$ | $S_{3,2}$ | $S_{3,3}$ | $S_{3,4}$ | ... | ... | $S_{3,N-2}$ | $S_{3,N-1}$ | $S_{3,N}$ | $hP_3$ | $dP_3$ |
| $S_{4,1}$ | $S_{4,2}$ | $S_{4,3}$ | $S_{4,4}$ | .. | .. | $S_{4,N-2}$ | $S_{4,N-1}$ | $S_{4,N}$ | $hP_4$ | $dP_4$ |
| : | : | : | | | | : | : | . | : | : |
| : | : | : | : | | | : | : | : | : | : |
| : | . | : | : | | | : | : | : | : | : |
| $S_{M-3,1}$ | $S_{M-3,2}$ | $S_{M-3,3}$ | $S_{M-3,4}$ | ... | ... | $S_{M-3,N-2}$ | $S_{M-3,N-1}$ | $S_{M-3,N}$ | $hP_{M-3}$ | $dP_{M-3}$ |
| $S_{M-2,1}$ | $S_{M-2,2}$ | $S_{M-2,3}$ | $S_{M-2,4}$ | ... | ... | $S_{M-2,N-2}$ | $S_{M-2,N-1}$ | $S_{M-2,N}$ | $hP_{M-2}$ | $dP_{M-2}$ |
| $S_{M-1,1}$ | $S_{M-1,2}$ | $S_{M-1,3}$ | $S_{M-1,4}$ | ... | ... | $S_{M-1,N-2}$ | $S_{M-1,N-1}$ | $S_{M-1,N}$ | $hP_{M-1}$ | $dP_{M-1}$ |
| $S_{M,1}$ | $S_{M,2}$ | $S_{M,3}$ | $S_{M,4}$ | ... | ... | $S_{M,N-2}$ | $S_{M,N-1}$ | $S_{M,N}$ | $hP_M$ | $dP_M$ |
| $dP_{M+1}$ | $dP_{M+2}$ | $dP_{M+3}$ | $dP_{M+4}$ | ... | ... | $dP_{M+N-2}$ | $dP_{M+N-1}$ | | | |

Stripes (row label at left)

Disks

| | | | | | | | | | | |
|---|---|---|---|---|---|---|---|---|---|---|
| $S_{1,1}$ | $S_{1,2}$ | $S_{1,3}$ | $S_{1,4}$ | ... | | $S_{1,N-2}$ | $S_{1,N-1}$ | $S_{1,N}$ | $hP_1$ | $d1P_1$ | $d2P_1$ |
| $S_{2,1}$ | $S_{2,2}$ | $S_{2,3}$ | $S_{2,4}$ | ... | ... | $S_{2,N-2}$ | $S_{2,N-1}$ | $S_{2,N}$ | $hP_2$ | $d1P_2$ | $d2P_2$ |
| $S_{3,1}$ | $S_{3,2}$ | $S_{3,3}$ | $S_{3,4}$ | . | . | $S_{3,N-2}$ | $S_{3,N-1}$ | $S_{3,N}$ | $hP_3$ | $d1P_3$ | $d2P_3$ |
| $S_{4,1}$ | $S_{4,2}$ | $S_{4,3}$ | $S_{4,4}$ | ... | ... | $S_{4,N-2}$ | $S_{4,N-1}$ | $S_{4,N}$ | $hP_4$ | $d1P_4$ | $d2P_4$ |
| : | . | : | : | | | : | : | : | : | : | . |
| : | : | . | : | | | : | | : | | . | : |
| : | : | . | : | | | : | : | . | . | . | : |
| $S_{M-3,1}$ | $S_{M-3,2}$ | $S_{M-3,3}$ | $S_{M-3,4}$ | . | .. | $S_{M-3,N-2}$ | $S_{M-3,N-1}$ | $S_{M-3,N}$ | $hP_{M-3}$ | $d1P_{M-3}$ | $d2P_{M-3}$ |
| $S_{M-2,1}$ | $S_{M-2,2}$ | $S_{M-2,3}$ | $S_{M-2,4}$ | ... | . | $S_{M-2,N-2}$ | $S_{M-2,N-1}$ | $S_{M-2,N}$ | $hP_{M-2}$ | $d1P_{M-2}$ | $d2P_{M-2}$ |
| $S_{M-1,1}$ | $S_{M-1,2}$ | $S_{M-1,3}$ | $S_{M-1,4}$ | ... | .. | $S_{M-1,N-2}$ | $S_{M-1,N-1}$ | $S_{M-1,N}$ | $hP_{M-1}$ | $d1P_{M-1}$ | $d2P_{M-1}$ |
| $S_{M,1}$ | $S_{M,2}$ | $S_{M,3}$ | $S_{M,4}$ | | ... | $S_{M,N-2}$ | $S_{M,N-1}$ | $S_{M,N}$ | $hP_M$ | $d1P_M$ | $d2P_M$ |
| $d1P_{M+1}$ | $d1P_{M+2}$ | $d1P_{M+3}$ | $d1P_{M+4}$ | .. | ... | $d1P_{M+N-2}$ | $d1P_{M+N-1}$ | | | | |
| | $d2P_{M+N-1}$ | $d2P_{M+N-2}$ | $d2P_{M+N-3}$ | | | $d2P_{M+3}$ | $d2P_{M+2}$ | $d2P_{M+1}$ | | | |

Stripes (row label at left)

Fig. 6

METHOD AND SYSTEM FOR A DISK FAULT TOLERANCE IN A DISK ARRAY USING ROTATING PARITY

BACKGROUND OF THE INVENTION

1. Field of the Invention

The present invention is generally related to disk array architectures, and, specifically, to disk array architectures that provide disk fault tolerance.

2. Related Art

It is known to store data in an array of disks managed by an array controller to control the storage and retrieval of data from the array. One example of such a system is a Redundant Array of Independent Disks (RAID) comprising a collection of multiple disks organized into a disk array managed by a common array controller. The array controller presents the array to the user as one or more virtual disks. Disk arrays are the framework to which RAID functionality is added in functional levels to produce cost-effective, high-performance disk systems having varying degrees of reliability based on the type of RAID architecture implemented. RAID architecture can be conceptualized in two dimensions as individual disks arranged in adjacent columns. Typically, each disk is partitioned with several identically sized data partitions known as strips, or minor stripes. Distributed across the array of disks in rows, the identically sized partitioned strips form a data stripe across the entire array of disks. Therefore, the array contains stripes of data distributed as rows in the array, wherein each disk is partitioned into strips of identically partitioned data and only one strip of data is associated with each stripe in the array.

As is known, RAID architectures have been standardized into several categories. RAID level 0 is a performance-oriented striped data mapping technique incorporating uniformly sized blocks of storage assigned in a regular sequence to all of the disks in the array. RAID level 1, also called mirroring, provides simplicity and a high level of data availability, but at a relatively high cost due to the redundancy of the disks. RAID level 3 adds redundant information in the form of parity data to a parallel accessed striped array, permitting regeneration and rebuilding of lost data in the event of a single-disk failure. RAID level 4 uses parity concentrated on a single disk to allow error correction in the event of a single disk failure, but the member disks in a RAID 4 array are independently accessible.

In a RAID 5 implementation, parity data is distributed across some or all of the member disks in the array. By distributing parity across some or all of an array's member disks, RAID 5 reduces (but does not eliminate) the write bottleneck inherent in RAID 4. Because all write operations require updating of the parity drive in a RAID 4 implementation, no I/O overlapping is possible, whereas all read and write operations can be overlapped in a RAID 5 implementation because the information is distributed throughout the array. Accordingly, the RAID 5 architecture achieves performance by striping data blocks among N disks, and provides fault-tolerance by using 1/N of its storage for parity blocks, calculated by taking the exclusive-or (XOR) of all data blocks in the parity disk row. However, a RAID 5 implementation can only recover from a single disk drive failure.

A RAID 6 architecture is similar to RAID 5, but RAID 6 can overcome the failure of any two disks by using an additional parity block for each row (for a storage loss of 2/N). The second parity block (Q) employs Reed-Solomon codes. One drawback of the known RAID 6 implementation is that it requires a complex and computationally time-consuming array controller to implement the Reed-Solomon codes necessary to recover from a two-disk failure. The complexity of Reed-Solomon codes may preclude the use of such codes in software, and may necessitate the use of expensive special purpose hardware. Thus, implementation of Reed-Solomon codes in a disk array increases the cost, complexity, and processing time of the array. In addition, the reservation of parity blocks in the array results in reduced write performance, because all write operations require updating of the parity blocks.

Thus, it would be desirable to provide system and method for implementing a multiple disk fault recovery architecture that provides multiple disk fault tolerance and reduced write bottlenecks. Specifically, it would be desirable to provide a method and system that is not subject to complex and computationally time-consuming array control functions encountered in known multiple disk fault tolerance implementations. In addition, it would be desirable to reduce the read bottlenecks associated with disk array architectures that reserve designated disks for parity information. Further, it would also be desirable to provide a method that does not limit the size or configuration of the array.

BRIEF SUMMARY OF THE INVENTION

Generally, the present invention fulfills the foregoing needs by providing, in one aspect thereof, a method for rotating information in a disk array to provide multiple disk fault tolerance with reduced write bottlenecks. The method includes indexing and organizing an array of disks into indexed stripes. The method also includes organizing each stripe into strips indexed by both disk and stripe, where each of the strips is located on only a corresponding single disk. The method further includes forming a plurality of blocks, each block comprising a plurality of stripes extending across multiple disks, reserving at least one stripe in each block for parity, dividing each block into a plurality of chunks, wherein at least one of the chunks in the block comprises parity information, and shifting the position of each parity chunk in each block to a different disk with respect to the parity chunk in adjacent blocks. The method also includes shifting the position of each parity strip in the at least one stripe in each block to a different disk with respect to the parity chunk in adjacent blocks.

The present invention further provides, in another aspect thereof, a system for rotating information in a disk array to provide multiple disk fault tolerance with reduced write bottlenecks. The system includes an array of disks consecutively indexed and organized into a indexed stripes, each stripe further including strips indexed by both disk and stripe. The system further includes an array controller configured to form blocks, each block including stripes extending across multiple disks and to reserve at least one stripe in each block for parity. The array controller is further configured to divide each block into chunks, wherein at least one of the chunks in the block is a parity chunk reserved for storing parity. The array controller is also configured to shift the position of each parity chunk in each block to a different disk with respect to the parity chunk in adjacent blocks. The array controller is also configured to shift the position of each parity strip in the at least one stripe in each block to a different disk with respect to the parity chunk in adjacent blocks.

BRIEF DESCRIPTION OF THE DRAWINGS

The features and advantages of the present invention will become apparent from the following detailed description of the invention when read with the accompanying drawings in which:

FIG. 4 illustrates an exemplary array block storage format to implement two disk fault tolerance in a disk array using horizontal and diagonal parity.

FIG. 5 illustrates an exemplary translation format for a two-disk fault tolerant disk array.

FIG. 6 illustrates an exemplary array block storage format to implement three-disk fault tolerance in a disk array using horizontal and diagonal parity

Figure 1:
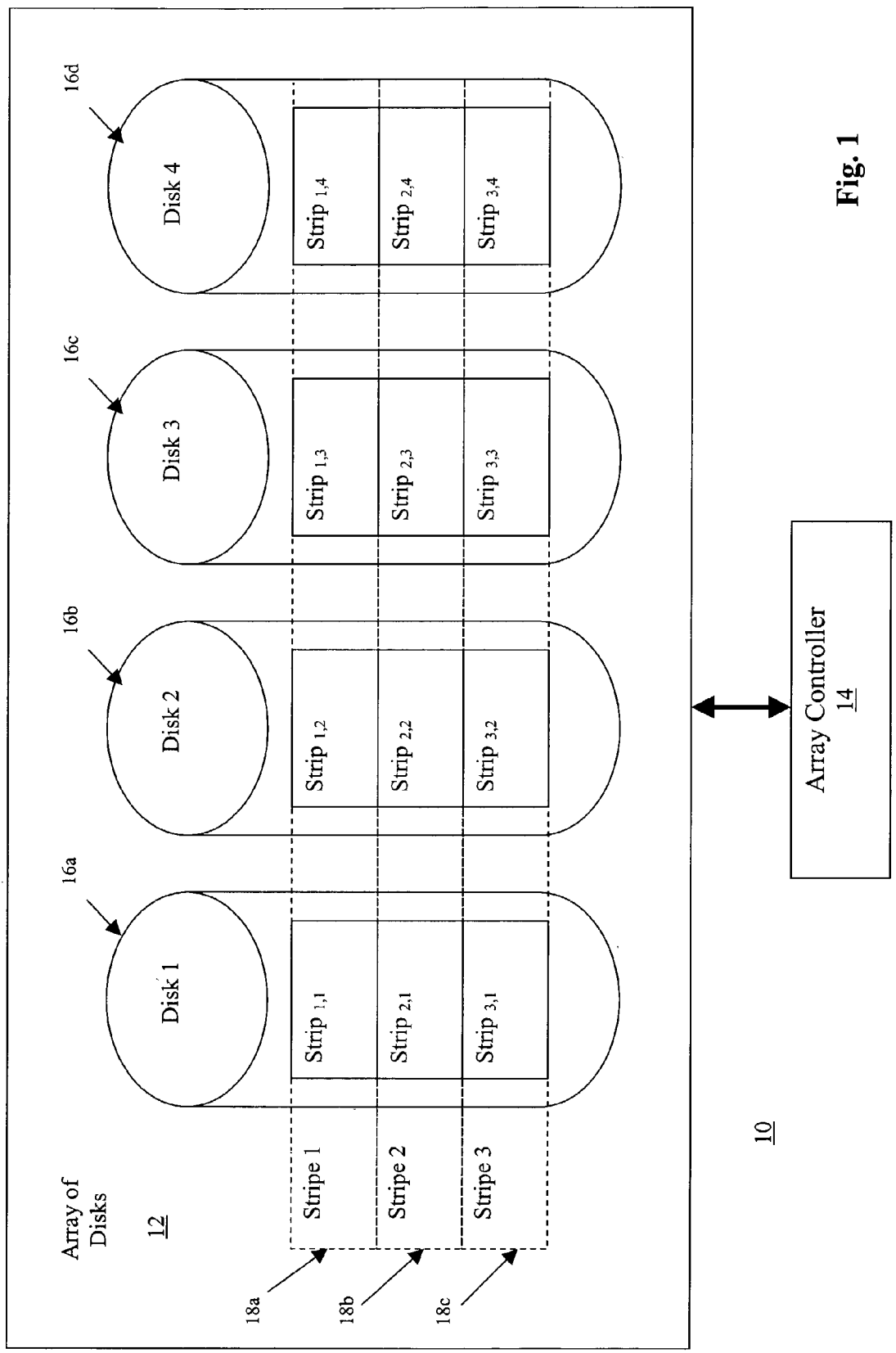
FIG. 1 illustrates a block diagram representation of a data storage system including an array controller and an array of disks.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 illustrates a data storage system 10 including an array of disks 12 for storing data and an array controller 14 for controlling the storage and retrieval of data in the array 12. In one aspect of the invention, the system 10 may be configured as a RAID 6 type architecture. The array controller 14, coupled to array of disks 12, allocates logical units, or strips, into logical rows, or stripes, extending across the physical disks in the array 12. According to one aspect of the invention, each disk in the array 12 is consecutively indexed, each stripe in the array is consecutively indexed, and each strip is indexed according to the corresponding disk and stripe membership. For example, the array 12 depicted in FIG. 1 includes four disks, disks 1–4 (16a–16d), allocated with three stripes, stripes 1–3 (18a–18c), so that each disk includes three strips indexed by both disk and stripe membership, and each stripe (18a–18c), includes four strips allocated across the disks (16a–16d). Each strip depicted in FIG. 1 includes an index corresponding to the strip location in a stripe and disk. For example, $Strip_{1,2}$ is a strip located on stripe 1 and disk 2. Although FIG. 1, for the sake of simplicity of illustration, illustrates a four disk array 12 having two data disks (16a, 16b) and configured to include three stripes (18a–18c), it will be understood that the present invention is not limited to a specific number of disks (such as the number of data disks being one less than a prime number) and stripes, nor is it limited to a square data disk configuration ("N×N" data disks).

Figure 2:
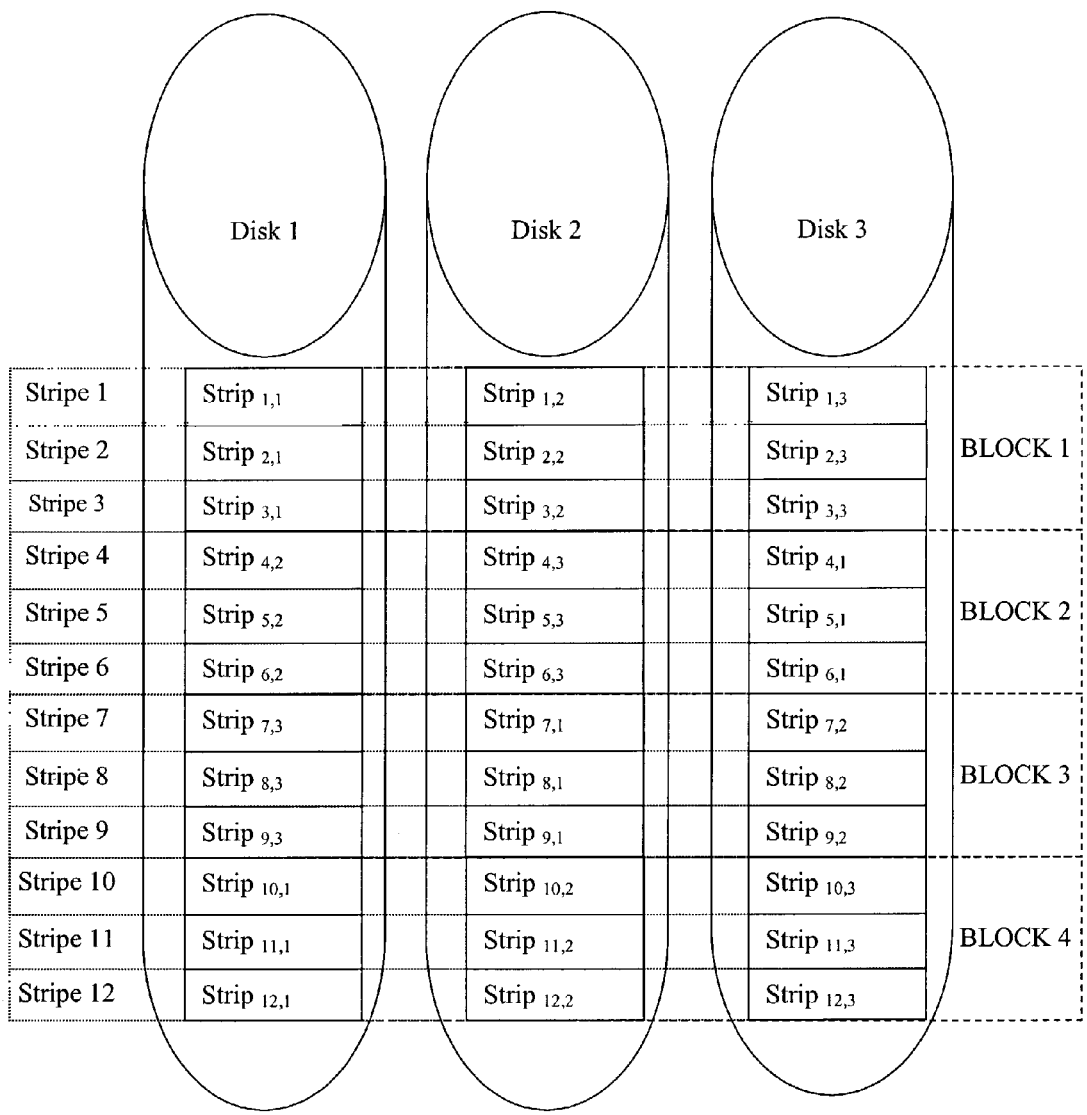
FIG. 2 illustrates an exemplary disk array allocated into blocks having translated chunks of information.

FIG. 2 illustrates an exemplary disk array allocated into blocks having translated chunks of parity information. The inventors have innovatively realized that by grouping stripes of a disk array into blocks, dividing the blocks into chunks of information (where at least one of the chunks includes parity information created for data in the array) and horizontally shifting while storing the chunks—with wrap-around—in each block with respect to the other blocks, read bottlenecks can be reduced in fault tolerant disk arrays. In particular, RAID arrays having reserved parity disks and at least one reserved parity stripe in each block can be made more efficient by distributing parity uniformly through out the array using the disclosed method.

As shown in FIG. 2, a three-disk array 19 is divided into twelve stripes so that each stripe includes a strip on each of the disks, for a total of three strips per stripe, e.g., Stripe 1 includes $Strip_{1,1}$, $Strip_{1,2}$, and $Strip_{1,3}$. The stripes of the array 19 are further sequentially grouped into blocks comprising three stripes, for a total of four blocks in the array 19. In an embodiment, one of the stripes in each block is reserved for parity information. As illustrated, Block 1 includes Stripes 1, 2, and 3. Stripe 3, for example, may be reserved for storing parity information. In an aspect of the invention, each block is divided into chunks of strips, where each chunk is defined by the intersection of a respective block and the respective disk on which the strips comprising the chunk are located. For example, $Strip_{1,1}$, $Strip_{2,1}$, and $Strip_{3,1}$ on Disk 1 form a first chunk of strips in Block 1. Accordingly, each strip of each chunk is defined by the intersection of a respective stripe and the respective disk on which the strip is located. In an aspect of the invention, the chunks of each block are indexed according to the chunks' respective disk location. For example, a chunk in block i of disk j may be represented as $c_{ij}$. In an embodiment, at least one of the chunks in each block comprises parity information corresponding to data stored in the array, and each chunk includes a strip reserved for parity, wherein the reserved strip is a member of the stripe reserved for storing parity.

To advantageously distribute parity data throughout the array, each chunk containing parity, or parity chunk, in a block is stored in a different disk with respect to a party chunk in an adjacent block. In addition, the parity strips of the reserved parity stripe are similarly shifted to different disks. In an embodiment, the parity chunks and the parity strips of the reserved parity stripe stored in each successive block are shifted to the left (or to a lower indexed disk) by one disk, with wrap around. Thus the parity chunk on a disk that is not the lowest indexed disk, is rotated and stored on the lower indexed disk, and the chunk on the lowest indexed disk is wrapped around to highest indexed disk in the array 19. Accordingly, the parity set corresponding to a respective parity chunk is shifted according to the shifted position of the respective parity chunk, so that the parity set from which the respective parity is calculated maintains, with wrap around, the same two-dimensional logical relationship. It should be noted that disk indices of the strips in each block of FIG. 2 represent the strip's disk location in an un-shifted position. Accordingly, as shown in Block 2 of FIG. 2, the parity chunk in each successive block has been shifted to the left by one disk with respect to the parity chunk in the preceding block. The corresponding chunks from which the parity is calculated are shown as shifted in relation to the shifting of the associated parity chunk. For example, the chunks from Disks 2 and 3 have been shifted to Disks 1 and 2, respectively. In addition, the displaced chunk from Disk 1 is wrapped around to Disk 3. As a result, the parity stored in a strip of the array is uniformly distributed throughout the array, allowing better read performance. Specifically, in the case of disk array schemes incorporating reserved parity disks, the disclosed rotation scheme eliminates bottlenecks associated with reading when using dedicated parity disk that lie dormant in a nominal array. The invention allows all disks to be used for reading data and thereby improving overall throughput.

Figure 3:
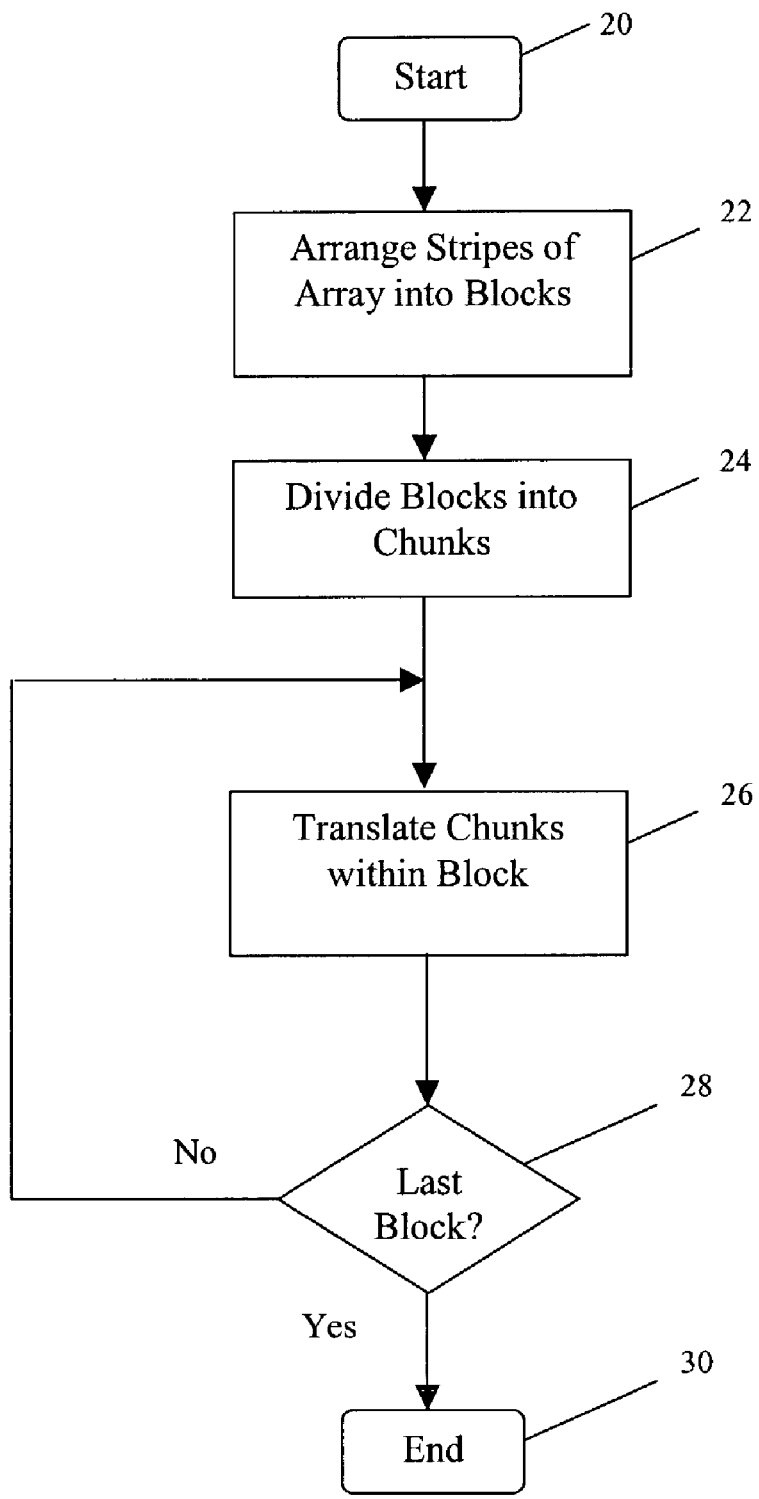
FIG. 3 is a flow chart illustrating a method of rotating information in a disk array to provide disk fault tolerance.

FIG. 3 is a flow chart illustrating a method of providing disk fault tolerance in an array of disks allocated as described above. The method can by implemented by the array controller 14, coupled to the array 12, and configured to perform the corresponding steps of the method. The method starts 20 by arranging the indexed stripes into blocks 22 of stripes. Next, each block is divided into chunks 24 made up of a set of indexed strips assembled from a respective disk, where the chunks are defined by the intersection of the block and the disk. For example, if a block is selected to include stripes 1–3 of a three-disk array such as the array depicted in FIG. 2, then the first chunk will include Strip $_{1,1}$, Strip $_{2,1}$, and Strip $_{3,1}$, from Disk 1. In an aspect of the invention, at least one of the chunks in the block comprises parity information corresponding to data stored in the array. After the block is divided into chunks, data and parity are stored so that each parity chunk and each parity strip of the reserved parity stripe are rotated 26 to a different defined disk within the same block with respect to a parity chunk and a parity strip of the reserved parity stripe in an adjacent block, so that parity information is distributed throughout the array. In addition, parity chunks and parity strips are wrapped around the array within the respective block as required during translation. In an aspect of the invention, each parity chunk in a respective block is shifted to a next lower indexed disk with respect to a preceding block, and the parity chunk located in the lowest indexed disk is wrapped to a highest indexed disk. For example, as shown in FIG. 2, the chunk including Strip $_{1,2}$, Strip $_{2,2}$, and Strip $_{3,2}$, from Disk 2 of a three-disk array is shifted to Disk 1 in the succeeding block. Accordingly, the chunk including Strip $_{1,1}$, Strip $_{2,1}$, and Strip $_{3,1}$, from Disk 1 would be wrapped around to Disk 3 in the succeeding block. The process of shifting the parity chunks and parity strips in each block is repeated until the parity chunks and parity strips in the last block in the array have been shifted. If the parity chunks and parity strips of the last block have not been shifted in step 28, then the process of shifting chunks in a block continues in step 26. If the parity chunks and parity strips in the last block have been shifted 28, the process ends in step 30.

In an aspect of the invention, the scheme for arranging stripes into blocks and translating chunks of information in the blocks is used to reduce read bottlenecks in disk arrays that include at least one dedicated parity disk. Furthermore, the invention provides an efficient method and system for reconstructing data on failed disks that is not subject to complex and computationally time-consuming array control functions encountered in known multiple disk fault tolerance implementations. While two examples of storing and reconstructing information in a disk array are provided in the following discussion, it should be understood that the inventive method and system might be applied to other disk array architectures without departing from the scope of the invention.

I. Two-Drive Fault Tolerant Array with Shifted Storage of Parity

A. Array Block Set Up

FIG. 4 illustrates an exemplary array block storage format to implement two-disk failure fault tolerance in a disk array using horizontal and diagonal parity. In the two dimensional arrangement shown in FIG. 4, a column represents a disk, $d_i$, having index i, with each cell in a column representing a strip in a disk. In FIG. 4, $S_{m,n}$ represents a data stripe having a data stripe index of m and a data disk index of n, and $dP_i$ and $hP_i$ represent diagonal and horizontal parity strips, respectively, having index i. The rows in FIG. 4 represent the stripes in the array. In an aspect of the invention, the first N disks are data disks, and the last two disks (N+1, N+2) are parity disks. For example, disk N+1 is used to store horizontal parity, hP, and disk N+2 is used to store diagonal parity, dP. The first M stripes in the array are used to store data, and stripe M+1, which includes the last strip on each of the first N−1 data disks, is used to store additional diagonal parity information. Accordingly, disks 1 to N are used for storing data in stripes 1 to M In one aspect of the invention, each horizontal parity set is arranged from the data stored in each stripe. The parity for each of the horizontal sets is stored in the corresponding strip of the respective stripe in the horizontal parity disk. For example, the first horizontal parity set is assembled as $S_{1,1}$ to $S_{1,N}$, and the parity for the group is stored in strip $hP_1$. In another aspect of the invention, diagonal parity sets are arranged across diagonals traversing stripes containing data, and the parity for each of the diagonal groups is stored in the corresponding strip in the diagonal parity disk and then, the diagonal parity stripe. For example, the first diagonal parity set is assembled as $S_{1,1}$ and the parity for the set is stored in strip $dP_1$ The second diagonal parity set is assembled as $S_{2,1}$ and $S_{1,2}$ and the parity for the set is stored in strip $dP_2$. The next adjacent data strips are assembled diagonally, and the process continues until the diagonal parity disk is filled (i.e., diagonal parities for diagonal parity sets up to index M.) For the next diagonal parity set, (i.e., diagonal parity set having index M+1) the diagonal parity is stored in a strip of the diagonal parity stripe so that all the contributing data strips of the diagonal parity set are at least one strip to the right of the strip used to store the diagonal parity for that set. The process of filling the diagonal parity stripe continues in this manner until the parities for the remaining diagonal parity sets are stored. (i.e., the diagonal parity set ending with set $S_{M,N}$.)

In a further aspect of the invention, the parity for each parity set is calculated using the XOR of the information in each data strip of the parity set according to the following formulas. For each horizontal parity set, the horizontal parity, $hP_i$, is calculated according to the equation:

$$hP_i = S_{i,1} \oplus S_{i,2} \oplus S_{i,3} \oplus \ldots S_{i,N}$$

where i is an index counter for the number of stripes in the array containing data, $S_{i,j}$ is the information stored in strip i of disk j, and N is the number of disks containing data.

For each diagonal parity set, the diagonal parity, $dP_i$, is calculated according to the equations:

$$dP_i = S_{1,i} \oplus S_{2,i-1} \oplus S_{3,i-2} \oplus \ldots S_{i,1}, \text{ for } i \leq N,$$

$$dP_i = S_{i-N+1,N} \oplus S_{i-N+2,N-1} \oplus S_{i-N+3, N-2} \oplus \ldots S_{i,1}, \text{ for } N < i \leq M; \text{ and}$$

$$dP_i = S_{i-N+1,N} \oplus S_{i-N+2,N-1} \oplus S_{i-N+3,N-2} \oplus \ldots S_{M,i-M+1}, \text{ for } M < i < M+N;$$

where i is an index counter for the parity strips, $S_{i,j}$ is the information stored in strip i of disk j, N is the number of disks containing data in the array, and M is the number of stripes containing data in the array.

B. Array Parity Shifting

Figure 5:
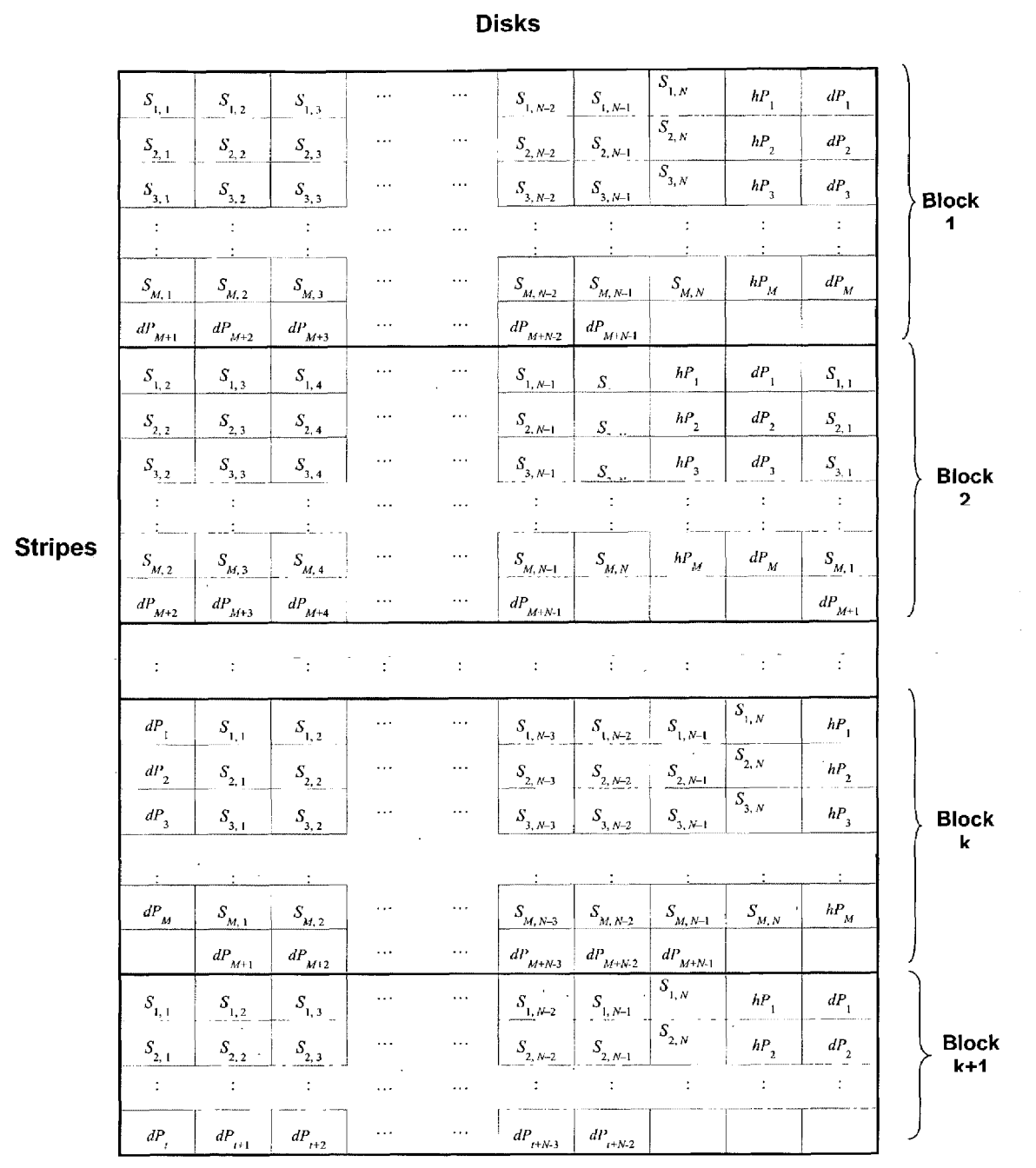

FIG. 5 illustrates an exemplary translation format for a two-disk fault tolerant disk array. In an aspect of the invention, the previously described scheme for two-drive fault tolerance can be applied to each block of a disk array grouped into blocks. It should be understood that while each chunk of each block is described as being shifted, only parity chunks and parity strips of a reserved parity stripe are actually shifted in a logical position within the block. The shifting of the chunks containing data does not describe actual shifting of data, but indicates that parity sets corresponding to respective parity chunks and parity strips of a reserved parity stripe are shifted in relation to the shifted location of the parity chunks and parity strips of a reserved parity stripe. As shown in FIG. 5, the storage format of FIG. 4 is iterated k times (block 1 through block k), with the position of each chunk in each block shifted one disk to the left (with wrap-around) with respect to the chunk position in the preceding block. In addition, a last block, block k+1 (having t stripes), is provided for any stripes left over when the array is grouped into blocks. The positions of the chunks in block k+1 are also shifted one disk to the left with respect to Block k. Although FIG. 5 shows a translation scheme wherein the chunks of Block k have been translated back to positions one disk to the right of their initial positions (with wrap-around) as displayed in Block 1. It is not necessary that Block k be configured in this manner. FIG. 5 merely illustrates an instance of the scheme and for different values of k the position of the chunks in Block k will vary. In fact, any number of blocks and translations may be used to distribute data and parity information throughout the array. Accordingly, if each block contains M+1 stripes, an array having a total of P stripes can be created so that P=(M+1) k+t, with $0 \leq t < M+1$ and k>0. If M is chosen such that k is significantly greater than N+2, then the number of times a respective (horizontal or diagonal) parity chunk falls on a disk can be approximately equal for each disk in an array. This allows each disk in the array to be used with equal efficiency for the retrieval of data. By populating and translating the chunks in each block according to the equations described above, data and parity can be efficiently recovered for disk failure events, such as the simultaneous failure of two disks in the array. Using the stored horizontal parity, the stored diagonal parity, and the remaining data on the disks as described in the Array Reconstruction section below, the information on failed disks can be quickly recreated by applying the techniques described therein on a block by block basis.

C. Array Reconstruction

Once the data and parity is stored in the array and translated according to the previous sections, data and parity can be efficiently recovered for disk failure events, such as the simultaneous failure of two disks in the array. In an aspect of the invention, data and parity, distributed throughout the array, can be simultaneously read from all intact disks to speed the recreation process. By using the stored horizontal parity, the stored diagonal parity, and the remaining data on the intact disks, the information on failed disks can be efficiently and quickly recreated. In the following scenarios, reconstruction is performed on a block-by-block basis by applying the techniques described above. As a result of translating the chunks in each block, different failure scenarios will apply to each block in the event of a disk failure. For example, a failure of the last disk in an array may result in the loss of diagonal parity chunk for the first block and a loss of a data chunk for the second block because the data chunk would have been translated into the last disk in the second block. Therefore, in the first block, the parity chunk needs to be recovered, while in the second block, the data chunk needs to be recovered. Accordingly, by considering the types of data affected by a disk failure on a block-by-block basis, the following reconstruction schemes can be used to recreate the data and parity for each block by applying the appropriate method corresponding to the data or parity in the block lost as a result of a disk failure.

1. Failure of Horizontal and Diagonal Parity Chunks

In the case of the failure of a disk including the horizontal parity chunk of a block and a disk including the diagonal parity chunk of a block, the reconstruction of the parities is straightforward. Because the data disks for the block remain intact, the horizontal parity for each horizontal parity set is simply recalculated and restored, and the diagonal parity for each diagonal parity set is simply recalculated and restored.

2. Failure of a Data Chunk and the Horizontal Parity Chunk

In the case of the failure of a disk including a data chunk and a disk including the horizontal parity chunk, reconstructing the lost data for a block includes reconstructing each of the data strips of the failed data chunk, starting with the strip on the lowest indexed stripe of the block, by using the corresponding diagonal parity and the other members of the corresponding diagonal parity set. Then, if applicable, the diagonal parity strip of the failed chunk is reconstructed by using the members of the corresponding diagonal parity set. Finally, each of the horizontal parity strips of the failed horizontal parity chunk is reconstructed by using the members of the corresponding horizontal parity set.

For example, the strips of a failed chunk $c_{ij}$ (where j indicates the index of the corresponding failed disk) are reconstructed starting with strip $S_{1,j}$ (where 1 indicates the first stripe in the current block) and proceeding to $S_{M,j}$ (where M indicates the last strip in the current block) using diagonal parity information. If j<N, the diagonal parity, $dP_{M+j}$, is reconstructed using the corresponding data strips which are intact, because the failed data chunk $c_{ij}$ does not contribute members to the calculation of the diagonal party $dP_{M+j}$. Finally, the horizontal parity strip set is reconstructed using the previously intact data strip set and the data strip set disk that has been reconstructed.

3. Failure of a Data Chunk and the Diagonal Parity Chunk

In the case of the failure of disks including a data chunk and the diagonal parity chunk of a block, reconstructing the lost data includes reconstructing each of the data strips of the failed data chunk, starting with the strip on the lowest indexed stripe of the block, by using the corresponding horizontal parity and the other members of the corresponding horizontal parity set. Then, the diagonal parity strip of the failed chunk is reconstructed using the members of the corresponding diagonal parity set. Finally, each of the diagonal parity strips of the failed diagonal parity chunk is reconstructed using the members of the corresponding diagonal parity set.

For example, the strips of a failed chunk $c_{ij}$ are reconstructed starting with strip $S_{1,j}$ and proceeding to $S_{M,j}$ using horizontal parity information. If j<N, the diagonal parity, $dP_{M+j}$ is reconstructed using the corresponding data strips which are intact, because the failed data chunk $c_{ij}$ does not contribute members to the calculation of the diagonal party $dP_{M+j}$. Finally, the diagonal parity disk is reconstructed using the previously intact data chunks and the data chunk $c_{ij}$ that has been reconstructed.

4. Failure of Two Data Chunks

In the case of the failure of two disks including data chunks of a block, where one chunk has a lower index, and the other chunk has a higher index, data is reconstructed of the block by starting at the strip on the lowest indexed stripe of the lower indexed failed data chunk and the strip on the lowest indexed stripe of the higher indexed failed data chunk. Data is then recreated in each of the failed chunks by alternately reconstructing the data strip of the lower indexed failed data chunk using the corresponding diagonal parity and the other members of the corresponding diagonal parity set. The data strip of the higher indexed failed data chunk is then reconstructed using the corresponding horizontal parity and the other members of the corresponding horizontal parity set. The process is alternately repeated, until each data strip in each of the failed chunks is reconstructed. Finally, each of the diagonal parity strips of the failed chunks is reconstructed by using the members of the corresponding diagonal parity sets.

For example, the data chunk having a lower index is designated as $c_{ij}$, and the other disk having a higher index is designated $c_{ik}$, where j<k. The data in each failed chunk is alternately reconstructed starting with strip $S_{1,j}$ using the corresponding diagonal parity information. This is possible because the strips contributing to the diagonal parity for $S_{1,j}$ all occur to the left of chunk $c_{ij}$ or on the unique diagonal parity disk, which is intact. Then, strip $S_{1,k}$ is reconstructed using the corresponding horizontal parity information. Next, strip $S_{2,j}$ is reconstructed using the corresponding diagonal parity information followed by strip $S_{2,k}$ using the corresponding horizontal parity information. If chunks $c_{ij}$ and $c_{ik}$ have been reconstructed up to stripe r−1, for some arbitrary value of r, the diagonal parity information required to reconstruct strip $S_{r,j}$ (where r is the stripe, or row, index) is available because the strips on data chunks needed to reconstruct strip $S_{r,j}$ are in rows less than r on chunks to the right of it and on rows greater than r on chunks to the left of it. The only potentially unavailable data strip required to reconstruct strip $S_{r,j}$ can be located on chunk $c_{ik}$. However, because chunk $c_{ik}$ is located to the right of chunk $c_{ij}$, the required data strip would have already been reconstructed using the method above before reconstruction of strip $S_{r,j}$ is started. Finally, the diagonal parity strip required to reconstruct strip $S_{r,j}$ is either located on the distinct diagonal parity chunk or is located on a chunk to the left of the chunk containing strip $S_{r,j}$, wherein both chunks are intact.

II. Three-Drive Fault Tolerant Array with Shifted Storage of Parity

A. Array Block Set Up

FIG. 6 illustrates an exemplary array block storage format to implement three-disk fault tolerance in a disk array using horizontal and diagonal parity. In the two dimensional arrangement shown in FIG. 6, a column represents a disk, $d_i$, having index i, with each cell in a column representing a strip in the disk. In addition, $S_{m,n}$ represents a data strip having a data stripe index of m and a data disk index of n, $hP_i$ represents a horizontal parity strips having index i, $d1P_i$ represents a diagonal parity strip corresponding to a first group of diagonal parity sets having index i, and $d2P_i$ represents a diagonal parity strip corresponding to a second group of diagonal parity sets having index i. The rows in FIG. 6 represent the stripes in the array. In an aspect of the invention, the first N disks are data disks, and the last three disks (N+1, N+2, N+3) are parity disks. For example, disk N+1 is used to store horizontal parity, hP, and disk N+2 and N+3 are used to store diagonal parities, d1P and d2P, respectively. In another aspect of the invention, the first M stripes in the array are used to store data, and stripes M+1 and M+2, which include the last two strips on each of the first N data disks, are used to store additional diagonal parity information. In particular, M+1 is used to store parity for the first group and M+2 is used to store parity for the second group. Accordingly, disks 1 to N are used for storing data in stripes 1 to M.

In one aspect of the invention, each horizontal parity set is arranged from the data stored in each stripe. The parity for each of the horizontal sets is stored in the corresponding strip of the respective stripe in the horizontal parity disk. For example, the first horizontal parity set is assembled as $S_{1,1}$ to $S_{1,N}$, and the parity for the set is stored in strip $hP_1$. In another aspect of the invention, diagonal parity sets are arranged across diagonals traversing stripes containing data, and the parity for each of the diagonal groups is stored in a strip in a diagonal parity disk and, when the diagonal parity disk is full, the remaining parities are stored in a diagonal parity stripe. For example, the first diagonal parity set of the first diagonal parity group is assembled as $S_{1,1}$ and the parity for the set is stored in strip $d1P_1$. The second diagonal parity set is assembled as $S_{2,1}$ and $S_{1,2}$ and the parity for the set is stored in strip $d1P_2$. The next adjacent data strips are assembled diagonally, and the process continues until the diagonal parity disk for group is filled (i.e., diagonal parities for diagonal parity sets up to index M.) For the next diagonal parity set, (i.e., diagonal parity set having index M+1) the diagonal parity is stored in a strip of the first diagonal parity stripe so that all the contributing data strips of the diagonal parity set are at least one strip to the right of the strip used to store the diagonal parity for that set. The process of filling the diagonal parity stripe continues in this manner until the parities for the remaining diagonal parity sets for the first group are stored. (i.e., the diagonal parity set ending with set $S_{M,N}$.)

Similarly, the first diagonal parity set of the second diagonal parity group is assembled as $S_{1,N}$ and the parity for the set is stored in strip $d2P_1$. The second diagonal parity set is assembled as $S_{1,N-1}$ and $S_{2,N}$ and the parity for the set is stored in strip $d2P_2$. The next adjacent data strips are assembled diagonally, and the process continues until the diagonal parity disk for group is filled (i.e., diagonal parities for the second group of diagonal parity sets up to index M.) For the next diagonal parity set, (i.e., the diagonal parity set of the second group having index M+1) the diagonal parity is stored in a strip of the second diagonal parity stripe so that all the contributing data strips of the diagonal parity set are at least one strip to the left of the strip used to store the diagonal parity for that set. The process of filling the diagonal parity stripe continues in this manner until the parities for the remaining diagonal parity sets for the second group are stored. (i.e., the diagonal parity set ending with set $S_{M,1}$).

In a further aspect of the invention, the parities for each parity set are calculated using the XOR of the information in each data strip of the parity set according to the following formulas. For each horizontal parity set, the horizontal parity, $hP_i$, is calculated according to the equation:

$$hP_i = S_{i,1} \oplus S_{i,2} \oplus S_{i,3} \oplus \ldots S_{i,N}$$

where i is an index counter for the number of stripes in the array containing data, $S_{i,j}$ is the information stored in strip i of disk j, and N is the number of disks containing data.

For each diagonal parity set of the first group, the diagonal parity, $d1P_i$, is calculated according to the equations:

$$d1P_i = S_{1,i} \oplus S_{2,i-1} \oplus S_{3,i-2} \oplus \ldots S_{i,1}, \text{ for } i \leq N;$$

$$d1P_i = S_{i-N+1,N} \oplus S_{i-N+2,N-1} \oplus S_{i-N+3,N-2} \oplus \ldots S_{i,1}, \text{ for } N < i \leq M; \text{ and}$$

$$d1P_i = S_{i-N+1,N} \oplus S_{i-N+2,N-1} \oplus S_{i-N+3,N-2} \oplus \ldots S_{M,i-M+1}, \text{ for } M < i < M+N;$$

where i is an index counter for the parity strips, $S_{i,j}$ is the information stored in strip i of disk j, N is the number of disks containing data in the array, and M is the number of stripes containing data in the array.

For each diagonal parity set of the second group, the diagonal parity, $d2P_i$, is calculated according to the equations:

$$d2P_i = S_{1,N-i+1} \oplus S_{2,N-i+2} \oplus S_{3,N-i+3} \oplus \ldots S_{i,N}, \text{ for } i \leq N,$$

$$d2P_i = S_{i-N+1,1} \oplus S_{i-N+2,2} \oplus S_{i-N+3,3} \oplus \ldots S_{M,M+N-i}, \text{ for } N < i \leq M; \text{ and}$$

$$d2P_i = S_{i-N+1,1} \oplus S_{i-N+2,2} \oplus S_{i-N+3,3} \oplus \ldots S_{M,M+N-i}, \text{ for } M < i < M+N;$$

where i is an index counter for the parity strips, $S_{i,j}$ is the information stored in strip i of disk j, N is the number of disks containing data in the array, and M is the number of stripes containing data in the array.

B. Array Parity Shifting

Figure 7:
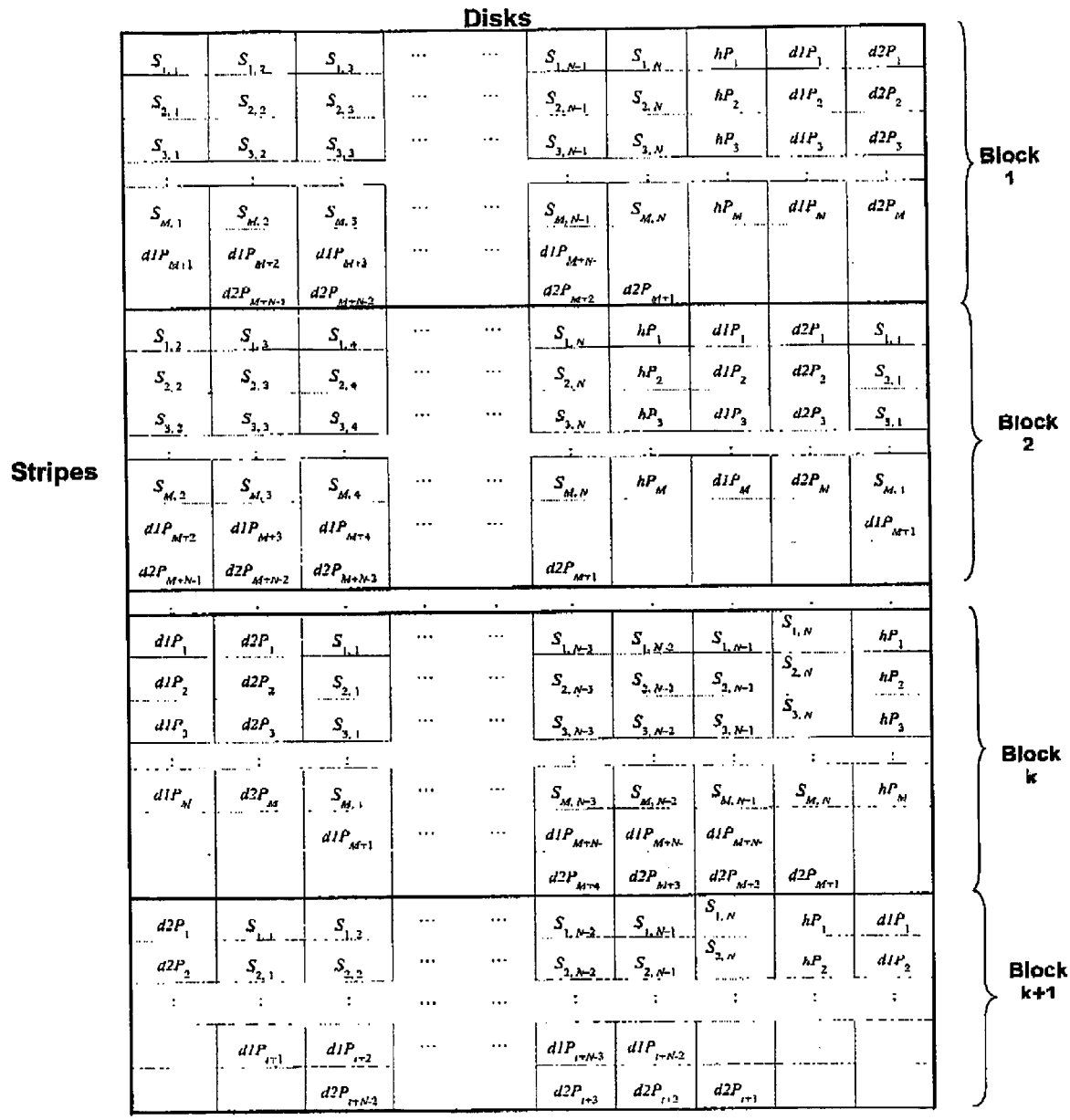
FIG. 7 illustrates an exemplary translation format for a three-disk fault tolerant disk array.

FIG. 7 illustrates an exemplary translation format for a three-disk fault tolerant disk array. In an aspect of the invention, the previously described scheme for three-drive fault tolerance can be applied to each block of a disk array grouped into blocks. It should be understood that while each chunk of each block is described as being shifted, only parity chunks and parity strips of a reserved parity stripe are actually shifted in a logical position within the block. The shifting of the chunks containing data does not describe actual shifting of data, but indicates that parity sets corresponding to respective parity chunks and parity strips of a reserved parity stripe are shifted in relation to the shifted location of the parity chunks and parity strips of a reserved parity stripe. As shown in FIG. 7, the storage format of FIG. 6 is iterated k times (Block 1 through Block k), with the position of each chunk in each block shifted one disk to the left (with wrap-around) with respect to the chunk position in the preceding block. In addition, a last block, Block k+1 (having t stripes), is provided for any stripes left over when the array is grouped into blocks. The position of the chunks in Block k+1 are shifted one disk to the left with respect to Block k. Although FIG. 7 shows a translation scheme wherein the chunks of Block k have been translated back to positions two disks to the right of their initial positions (with wrap-around) as displayed in Block 1. It is not necessary that Block k be configured in this manner. FIG. 7 merely illustrates an instance of the scheme and for different values of k the position of the chunks in Block k will vary. In fact, any number of blocks and translations may be used to distribute data and parity information throughout the array. Accordingly, if each block contains M+2 stripes, an array having a total of P stripes can be created so that P=(M+2)k+t, with $0 \leq t < M+2$ and k>0. If M is chosen such that k is significantly greater than N+3, then the number of times a respective (horizontal or diagonal) parity chunk falls on a disk can be approximately equal for each disk in an array. This allows each disk in the array to be used with equal efficiency for the retrieval of data. By populating and translating the chunks in each block according to the equations described above, data and parity can be efficiently recovered for disk failure events, such as the simultaneous failure of three disks in the array. Using the stored horizontal parity, the stored diagonal parity, and the remaining data on the disks as described in the Array Reconstruction section above, the information on failed disks can be quickly recreated by applying the above described techniques on a block by block basis.

C. Array Reconstruction

Once the data and parity is stored in the array and translated according to the previous sections, data and parity can be efficiently recovered for disk failure events, such as the simultaneous failure of three disks in the array. In an aspect of the invention, data and parity, distributed throughout the array, can be simultaneously read from all intact disks to speed the recreation process. By using the stored horizontal parity, the stored diagonal parity, and the remaining data on the intact disks, the information on failed disks can be efficiently and quickly recreated. In the following scenarios, reconstruction is performed on a block-by-block basis by applying the techniques described above. As a result of translating the chunks in each block, different failure scenarios will apply to each block in the event of a disk failure. For example, a failure of the last disk in an array may result in the loss of diagonal parity chunk for the first block and a loss of a data chunk for the second block because the data chunk would have been translated into the last disk in the second block. Therefore, in the first block, the diagonal parity chunk needs to be recovered, while in the second block, the data chunk needs to be recovered. Accordingly, by considering the types of data affected by a disk failure on a block-by-block basis, the following reconstruction schemes can be used to recreate the data and parity for each block by applying the appropriate method corresponding to the data or parity in the block lost as a result of a disk failure.

1. Failure of Horizontal, First Diagonal, and Second Diagonal Parity Chunks

In the case of the failure of a disk including the horizontal parity chunk of a block and a disks including the first and second diagonal parity chunks of a block, the reconstruction of the parities is straightforward. Because the data chunks remain intact, the horizontal parity for each horizontal parity set is simply recalculated and restored, and the diagonal parity for each diagonal parity set is recalculated and restored in the respective diagonal parity chunk and diagonal parity stripe.

2. Failure of a Data Chunk, the Horizontal Parity Chunk, and One Diagonal Parity Chunk In the case of the failure of a disk including a data chunk, the horizontal parity chunk, and one diagonal parity chunk of a block, reconstructing the lost data includes reconstructing each of the data strips of the failed data chunk, starting with the strip on the lowest indexed stripe, by using the corresponding diagonal parity from the intact diagonal parity chunk and the other members of the corresponding diagonal parity set. Then, if the failed data chunk index is less than the highest indexed data disk in the array (for example, in a 8 disk array the highest index of data disk is 5), the diagonal parity strip in the first parity stripe of the failed chunk is reconstructed by using the members of the corresponding diagonal parity set. If the failed data chunk index is greater than the lowest indexed data disk in the array, the diagonal parity strip in the second parity stripe of the failed disk is reconstructed by using the members of the corresponding diagonal parity set. Finally, each of the horizontal parity strips of the failed horizontal parity chunk is reconstructed by using the members of the corresponding horizontal parity set, and each of the diagonal parity strips of the failed diagonal parity chunk is reconstructed by using the members of the corresponding diagonal parity set.

For example, the strips of a failed chunk $c_{ij}$ are reconstructed starting with strip $S_{1,j}$ and proceeding to $S_{M,j}$ using diagonal parity information from the intact diagonal parity chunk. If j<N, the diagonal parity $d1P_{M+j}$ in the first diagonal parity stripe is reconstructed using the corresponding data strips which are intact, because the failed data chunk $c_{ij}$ does not contribute members to calculation of the diagonal party $d1P_{M+j}$. If $j>1$, the diagonal parity $d2P_{M+N+1-j}$ in the second diagonal parity stripe is reconstructed using the corresponding data strips which are intact, because the failed data chunk $c_{ij}$ does not contribute members to calculation of the diagonal party $d2P_{M+N+1-j}$. Finally, the horizontal parity chunk is reconstructed using the previously intact data chunks and the data chunk that has been reconstructed.

3. Failure of Two Data Chunks and a Diagonal Parity Chunk

In the case of the failure of disks including two data chunks (where one chunk has a lower index, and the other chunk has a higher index) and a failed second diagonal parity chunk, data is reconstructed by starting at the strip on the lowest indexed stripe of the lower index failed data chunk and the strip on the lowest indexed stripe of the higher index failed data chunk. Data is then recreated in each of the failed chunks by alternately reconstructing the data strip of the lower indexed failed data chunk by using the corresponding diagonal parity and the other members of the corresponding diagonal parity set of the first group. The data strip of the higher indexed failed data chunk is then reconstructed by using the corresponding horizontal parity and the other members of the corresponding horizontal parity set. The process is alternately repeated until each data strip in each of the failed chunks is reconstructed. Finally, each of the diagonal parity strips of the failed chunks is reconstructed by using the members of the corresponding diagonal parity set.

For example, the chunk having a lower index is designated as cu, and the chunk having a higher index is designated $c_{ik}$, where j<k. The data in each failed chunk is alternately reconstructed starting with strip $S_{1,j}$ using the corresponding diagonal parity information of the first group. This is possible because the strips contributing to the diagonal parity for $S_{1,j}$ all occur to the left (wrapping leftward around the block) of chunk $c_{ij}$ or on the corresponding first diagonal parity chunk, which is intact. Then, strip $S_{1,k}$ is reconstructed using the corresponding horizontal parity information. Next, strip $S_{2,j}$ is reconstructed using the corresponding diagonal parity information of the first group, followed by strip $S_{2,k}$ using the corresponding horizontal parity information.

If general for any arbitrary value of r<N+M, the diagonal parity information of the first group required to reconstruct strip $S_{r,j}$ is guaranteed to be available because the strips on data chunks needed to reconstruct the diagonal parity information of the first group are in rows less than r on disks to the right (wrapping rightward around the block) of strip $S_{r,j}$ and on rows greater than r on disks to the left (wrapping leftward around the block) of strip $S_{r,j}$. At this point, the only potentially unavailable data strip required for this purpose is found on chunk $c_{ik}$. However, since chunk $c_{ik}$ is located to the right (wrapping rightward around the block) of chunk $c_{ij}$, the required data strip would have been already reconstructed using the described technique before arriving at strip $S_{r,j}$. Furthermore, the diagonal parity strip required to reconstruct strip $S_{r,j}$ is either located on the first diagonal parity chunk or is located on a chunk to the left (wrapping leftward around the block) of the first diagonal parity disk, wherein the required chunks are intact. Once all the data strips have been reconstructed, the corresponding diagonal parity strips are recreated as needed and the failed second parity chunk is recreated using the members of the corresponding diagonal parity set.

In the case of two failed chunks (where one chunk has a lower index, and the other chunk has a higher index) and a failed first diagonal parity chunk, the chunk having a lower index is designated as $c_{ij}$ and the chunk having a higher index is designated $c_{ik}$, where j<k. The data in each failed chunk is alternately reconstructed starting with strip $S_{1,k}$ using the corresponding diagonal parity information of the second group. This is possible because the strips contributing to the diagonal parity for $S_{1,k}$ all occur to the right (wrapping rightward around the block) of chunk $c_{ik}$, or on the second diagonal parity chunk, wherein all contributing strips are intact. Next, strip $S_{1,j}$ is reconstructed using the corresponding horizontal parity information. Then, strip $S_{2,k}$ is reconstructed using the corresponding diagonal parity information of the second group, followed by reconstruction of strip $S_{2,j}$ using the corresponding horizontal parity information. In general, the diagonal parity information of the second group required to reconstruct strip $S_{r,k}$ for some arbitrary r<N+M, is guaranteed to be available since the strips on data chunks needed to reconstruct strip $S_{r,k}$ are in rows less than r on chunks to the left (wrapping leftward around the block) of strip $S_{r,k}$ and on rows greater than r on chunks to the right (wrapping rightward around the block) of strip $S_{r,k}$. Now, the only potentially unavailable data strip required for this purpose is located on chunk $c_{ij}$. However, since disk $c_{ij}$ is located to the left (wrapping leftward around the block) of chunk $c_{ik}$, the required data strip would have been already reconstructed using described technique before arriving at strip $S_{r,k}$. Furthermore, the diagonal parity strip required to reconstruct strip $S_{r,k}$ is either located on the second diagonal parity chunk or located on a chunk to the right (wrapping rightward around the block) of the second diagonal parity chunk, wherein the chunks are intact.

Once all the data strips have been reconstructed, the corresponding diagonal parity strips are recreated as needed and the failed first parity chunk is recreated using the members of the corresponding diagonal parity set.

4. Failure of Two Data Disks and a Horizontal Parity Disk

In the case of the failure of disks including two data chunks (where one chunk has a lower index, and the other chunk has a higher index) and a horizontal parity chunk, data is reconstructed by starting at the strip on the lowest indexed stripe of the lower indexed failed data chunk and the strip on the lowest indexed stripe of the higher indexed failed data chunk. Data is then recreated by alternately reconstructing the data strip of the lower indexed failed data chunk by using the corresponding diagonal parity and the other members of the corresponding diagonal parity set of the first group. Then, the data strip of the higher indexed failed data chunk is reconstructed by using the corresponding diagonal parity and the other members of the corresponding diagonal parity set of the second group, until each data strip of the failed chunks are reconstructed. Next, each of the diagonal parity strips of the failed chunks is reconstructed using the members of the corresponding diagonal parity set. Finally, each of the horizontal parity strips of the failed horizontal parity chunk is reconstructed by using the members of the corresponding horizontal parity set.

For example, the chunk having a lower index is designated as $c_{ij}$, and the chunk having a higher index is designated $c_{ik}$, where j<k. The data in each failed chunk is alternately reconstructed starting with strip $S_{1,j}$ using the corresponding diagonal parity information of the first parity group. This reconstruction is possible because the strips contributing to the diagonal parity for $S_{1,j}$ all occur to the left (wrapping leftward around the block) of chunk $c_{ij}$ or on the unique first diagonal parity chunk, wherein the necessary strips are intact. Next, strip $S_{1,k}$ is reconstructed using the corresponding diagonal parity information of the second group. This reconstruction is possible because the strips contributing to the diagonal parity for $S_{1,k}$ all occur to the right (wrapping rightward around the block) of chunk $c_k$ or on the unique second diagonal parity chunk, wherein the necessary strips are intact. Next, strip $S_{2,j}$ is reconstructed using the corresponding diagonal parity information of the first group. Then, strip $S_{2,k}$ is reconstructed using the corresponding diagonal parity information of the second group. In general, the diagonal parity information of the first group required to reconstruct strip $S_{r,j}$ for some arbitrary r<N+M, is guaranteed to be available since the strips on data disks needed to reconstruct it are in rows less than r on disks to the right of it (wrapping rightward around the block) and on rows greater than r on disks to the left of it (wrapping leftward around the block). The only unavailable data strip required to reconstruct strip $S_{r,j}$ can be located on chunk $c_{ik}$. However, since chunk $c_{ik}$ is located to the right of chunk $c_{ij}$ (wrapping rightward around the block), the required data strip would have been already reconstructed using the described scheme before arriving at strip $S_{r,j}$.

Similarly, the diagonal parity information of the second group required to reconstruct strip $S_{r,k}$ for some arbitrary r<N+M, is always guaranteed to be available since the strips on data disks needed to reconstruct it are in rows less than r on disks to the left of it (wrapping leftward around the block) and on rows greater than r on disks to the right of it (wrapping rightward around the block). At this point, the only unavailable data strip required for this purpose can be located on chunk $c_{ij}$. However, since chunk $c_{ij}$ is located to the left of chunk $c_{ik}$ (wrapping leftward around the block), the required data strip would have been already reconstructed using this scheme before we arrive at strip $S_{r,k}$. Furthermore, the diagonal parity strip required to reconstruct strip $S_{r,j}$ is either located on the first diagonal parity chunk or is located on a disk to the left of strip $S_{r,j}$ (wrapping leftward around the block), wherein the chunks are intact. Similarly, the diagonal parity strip required to reconstruct strip $S_{r,k}$ is either located on the distinct second diagonal parity chunk or on a chunk to the right of strip $S_{r,k}$ (wrapping rightward around the block) wherein the chunks are intact. Finally the applicable diagonal parity strips on the chunks $c_{ij}$ and $c_{ik}$ and the horizontal parity chunk are reconstructed using the appropriate data strips that are all intact.

5. Failure of Three Data Chunks

In the case of the failure of disks including three data chunks, where one chunk has a lowest index, one chunk has an intermediate index, and one chunk has a highest index, data is reconstructed by starting at the strip on the lowest indexed stripe of the lowest index failed data chunk, the strip on the lowest indexed stripe of the highest index failed data chunk and the strip on the lowest index stripe of the intermediate index failed data chunk. Data is then recreated by alternately reconstructing the data strip of the lowest index failed data chunk by using the corresponding diagonal parity and the other members of the corresponding diagonal parity set of the first group. Then, the data strip of the highest index failed data chunk is reconstructed by using the corresponding diagonal parity and the other members of the corresponding diagonal parity set of the second group. Next, the data strip of the intermediate index failed data chunk is reconstructed by using the corresponding horizontal parity and the other members of the corresponding horizontal parity set. This alternating process is repeated until each data strip each of the failed chunks is reconstructed. Finally, each of the diagonal parity strips of the failed chunk is reconstructed by using the members of the corresponding diagonal parity set.

For example, the chunk having a lowest index is designated as $c_{ij}$, the chunk having the intermediate index is designated $c_{ik}$, and the chunk having the highest index is designated $c_{il}$, where j<k<l. The data in each failed chunk is alternately reconstructed starting with strip $S_{1,j}$ and reconstructing the strip using the diagonal parity information of the first group. This is possible because the strips contributing to the diagonal parity for $S_{1,j}$ all occur to the left (wrapping leftward around the block) of chunk $c_{ij}$ or on the first diagonal parity chunk, wherein the necessary chunks are intact. Then, strip $S_{1,l}$ is reconstructed using the corresponding diagonal parity information of the second group. Again, this is possible because the strips contributing to the diagonal parity for $S_{1,l}$ all occur to the right (wrapping rightward around the block) of chunk $c_{il}$ or on the second diagonal parity disk, wherein the required chunks are all intact. At this point, strip $S_{1,k}$ is reconstructed using the horizontal parity information.

Similarly, strip $S_{2,j}$ is reconstructed using the corresponding diagonal parity information of the first group, strip $S_{2,l}$ is reconstructed using the corresponding diagonal parity information of the second group, and strip $S_{2,k}$ is reconstructed using the horizontal parity information (in that order). In general, for any arbitrary value of r<N+M, the diagonal parity information of the first group required to reconstruct strip $S_{r,j}$ and the right diagonal parity information of the second group required to reconstruct strip $S_{r,l}$ are guaranteed to be available. For a given strip $S_{r,j}$, the strips on data chunks needed to reconstruct $S_{r,j}$ are in rows less than r on disks to the right of the strip $S_{r,j}$ (wrapping rightward around the block) and on rows greater than r on disks to the left of strip $S_{r,j}$ (wrapping leftward around the block). The only unavailable data strips required for this purpose can be located on chunks $c_{ik}$ and $c_{il}$. However, since chunks $c_{ik}$ and $c_{il}$ are located to the right of chunk $c_{ij}$, (wrapping rightward around the block) the required data strips would have been already reconstructed, using the process previously described, before arriving at strip $S_{r,j}$. Furthermore, the diagonal parity strip required to reconstruct strip $S_{r,j}$ is either located on the corresponding diagonal parity chunk, or is located on a chunk to the left of strip $S_{r,j}$ (wrapping leftward around the block), wherein the necessary chunks are intact.

Similarly, the strips on data chunks needed to reconstruct $S_{r,l}$ are in rows greater than r on chunks to the right of strip $S_{r,l}$ (wrapping rightward around the block) and on rows less than r on chunks to the left of strip $S_{r,l}$ (wrapping leftward around the block). The only unavailable data strips required for this purpose can be located on chunks $c_{ij}$ and $c_{ik}$. However, since chunks $c_{ij}$ and $c_{ik}$ are located to the left of chunk $c_{il}$, (wrapping leftward around the block) the required data strips would have been already reconstructed using the process described previously before arriving at strip $S_{r,l}$. Furthermore, the diagonal parity strip required to reconstruct strip $S_{r,l}$ is either located on the corresponding diagonal parity disk or is located on a disk to the right of strip $S_{r,l}$ (wrapping rightward around the block), wherein the necessary disks are intact. Finally, the diagonal parity strips on the chunks $c_{ij}$, $c_{ik}$ and $c_{il}$ are reconstructed using the appropriate data strips that are intact.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only: Numerous variations, changes and substitutions will occur to those of skill in the art without departing from the invention herein. Accordingly, it is intended that the invention be limited only by the spirit and scope of the appended claims.

What is claimed is:

1. A method of providing disk fault tolerance in an array of independent data storage disks, wherein the disks are indexed and organized into a plurality of indexed stripes, each stripe further comprising a plurality of strips indexed by both disk and stripe, each of the strips being located on only a corresponding single disk, the method comprising:
    forming a plurality of blocks, each block comprising a plurality of stripes extending across multiple disks;
    reserving at least one parity stripe in each block for storing only parity in parity strips of the parity stripe;
    dividing each block into a plurality of chunks, wherein each chunk is defined by the intersection of a respective block and the respective disk on which the strips comprising the chunk are located, and each strip of each chunk is defined by the intersection of a respective stripe and the respective disk on which the strip is located;
    reserving at least one of the chunks for storing horizontal parity;
    reserving at least one of the chunks for storing diagonal parity;
    arranging, in respective blocks, strips containing data into horizontal and diagonal parity sets, wherein each parity set comprises at least one data strip as a member and no single data strip is repeated in any one parity set;
    calculating, for respective blocks, a horizontal parity for each horizontal parity set;
    calculating, for respective blocks, a diagonal parity for each diagonal parity set;
    storing, in respective blocks, each respective calculated horizontal parity of each horizontal parity set in a corresponding strip of a horizontal parity chunk;
    storing, in respective blocks, at least some of the calculated diagonal parities of each diagonal parity set in a respective one of a plurality of strips of a first diagonal parity chunk and storing, in respective blocks, a remainder of the calculated diagonal parities in a respective one of a plurality of strips in a first diagonal parity stripe so that no members of a contributing diagonal parity set have the same disk index as the disk index of the respective one of a plurality of strips of the first diagonal parity stripe; and
    shifting the position of each parity chunk in each block to a different disk with respect to a corresponding parity chunk storing parity values of a corresponding parity set in adjacent blocks.

2. The method of claim 1 further comprising shifting the position of each parity strip in the at least one parity stripe in each block to a different disk with respect to corresponding parity strips in parity stripes in adjacent blocks.

3. The method of claim 1, wherein shifting each parity chunk comprises:
    moving each parity chunk in a block to a next lower indexed disk with respect to a preceding block; and
    wrapping a parity chunk located in a lowest indexed disk to a highest indexed disk.

4. The method of claim 1, further comprising, for each block:
    establishing an initial diagonal parity set in a first diagonal direction as a data strip having the lowest disk index and the lowest stripe index of the block;
    establishing consecutive diagonal parity sets by diagonally grouping the data strips adjacent to the previously established diagonal parity set until each data strip has been assembled into a diagonal parity set without wrapping around the array; and
    grouping the established sets in the first diagonal direction into a first group.

5. The method of claim 4 further comprising, for each block:
    establishing an initial diagonal parity set in a second diagonal direction different from the first diagonal direction as a data strip having the highest disk index of a disk storing data and the lowest stripe index of the block;
    establishing consecutive diagonal parity sets by diagonally assembling the data strips adjacent to the previously established diagonal parity set until each data strip has been assembled into a diagonal parity set without wrapping around the array; and
    grouping the established sets in the second diagonal direction into a second group so that each data strip is a member of the first and second group.

6. The method of claim 1 further comprising, for each block:
    reserving the first diagonal parity stripe, across each of the disks in the array, to store diagonal parity; and
    reserving the remaining unreserved strips in the remaining unreserved columns of the block for data.

7. The method of claim 5, further comprising, for each block:
    reserving a second diagonal parity chunk to store diagonal parity for the second group; and
    reserving a second diagonal parity stripe to store diagonal parity for the second group.

8. The method of claim 1, wherein calculating the horizontal parity, $hP_i$, for each stripe containing data in each block using the XOR of the information in each data strip is performed according to the equation:

$$hP_i = S_{i,1} \oplus S_{i,2} \oplus S_{i,3} \ldots S_{i,N}$$

where i is an index counter for the number of stripes in the array containing data, $S_{i,j}$ is the information stored in strip i of column j, and N is the number of disks containing data.

9. The method of claim 4, wherein calculating a diagonal parity, $d1P_i$, for each diagonal set of a first group traversing the stripes containing data using the exclusive-or sum of the information in each diagonal is performed according to the equations:

$$d1P_i = S_{1,i} \oplus S_{2,i-1} \oplus S_{3,i-2} \oplus \ldots S_{i,1}, \text{ for } i \leq N;$$

$$d1P_i = S_{i-N+1,N} \oplus S_{i-N+2,N-1} \oplus S_{i-N+3,N-2} \oplus \ldots S_{i,1}, \text{ for } N < i \leq M; \text{ and}$$

$$d1P_i = S_{i-N+1,N} \oplus S_{i-N+2,N-1} \oplus S_{i-N+3,N-2} \oplus \ldots S_{M,i-M+1}, \text{ for } M < i < M+N;$$

where i is an index counter for the number of stripes in the block containing data, $S_{i,j}$ is the information stored in strip i of column j, N is the number of disks containing data in the array, and M is the number of stripes containing data in the block.

10. The method of claim 5, wherein calculating a diagonal parity, $d2P_i$, for each diagonal of a second group traversing the stripes containing data using the exclusive-or sum of the information in each diagonal is performed according to the equations:

$$d2P_i = S_{1,N-i+1} \oplus S_{2,N-i+2} \oplus S_{3,N-i+3} \oplus \ldots S_{i,N}, \text{ for } i \leq N;$$

$$d2P_i = S_{i-N+1,1} \oplus S_{i-N+2,2} \oplus S_{i-N+3,3} \oplus \ldots S_{i,N}, \text{ for } N < i \leq M; \text{ and}$$

$$d2P_i = S_{i-N+1,1} \oplus S_{i-N+2,2} \oplus S_{i-N+3,3} \oplus \ldots S_{M,M+N-i}, \text{ for } M < i < M+N;$$

where i is an index counter for the number of stripes in the block containing data, $S_{i,j}$ is the information stored in strip i of column j, N is the number of disks containing data in the array, and M is the number of stripes containing data in the block.

11. The method of claim 1, further comprising, for each block, reconstituting lost data on simultaneously failed disks by using the corresponding stored parity and data stored in the chunks on the remaining intact disks of the array.

12. A system for providing disk fault tolerance in an array of independent disks, comprising:
an array of disks consecutively indexed and organized into a plurality of indexed stripes, each stripe further comprising a plurality of strips indexed by both disk and stripe; and
an array controller coupled to the disk array and configured to:
form a plurality of blocks, each block comprising a plurality of stripes extending across multiple disks;
reserve at least one parity stripe in each block for storing only parity in parity strips of the parity stripe;
divide each block into a plurality of chunks, wherein each chunk is defined by the intersection of a respective block and the respective disk on which the strips comprising the chunk are located, and each strip of each chunk being defined by the intersection of a respective stripe and the respective disk on which the strip is located;
reserve at least one of the chunks for storing horizontal parity;
reserve at least one of the chunks for storing diagonal parity;
arrange, in respective blocks, strips containing data into horizontal and diagonal parity sets, wherein each parity set comprises at least one data strip as a member and no single data strip is repeated in any one parity set;
calculate, for respective blocks, a horizontal parity for each horizontal parity set for each block;
calculate, for respective blocks, a diagonal parity for each diagonal parity set for each block;
store, in respective blocks, each respective calculated horizontal parity of each horizontal parity set in a corresponding strip of a horizontal parity chunk for each block;
store, in respective blocks, at least some of the calculated diagonal parities of each diagonal parity set in a respective one of a plurality of strips of a first diagonal parity chunk and store, in respective blocks, a remainder of the calculated diagonal parities in a respective one of a plurality of strips in a first diagonal parity stripe so that no members of a contributing diagonal parity set have the same disk index as the disk index of the respective one of a plurality of strips of the first diagonal parity stripe for each block; and
shift the position of each parity chunk in each block to a different disk with respect to the parity chunk in adjacent blocks.

13. The system of claim 12, wherein the array controller is further configured to shift the position of each parity strip in the at least one parity stripe in each block to a different disk with respect to corresponding parity strips in parity stripes in adjacent blocks.

14. The system of claim 12, wherein the array controller is further configured to:
rotate each parity chunk in a block to a next lower indexed disk with respect to a preceding block; and
wrap a parity chunk located in a lowest indexed disk to a highest indexed disk.

15. The system of claim 12, wherein the array controller is further configured for arranging strips containing data into diagonal parity sets, for respective blocks by:
establishing an initial diagonal parity set in a first diagonal direction as a data strip having the lowest disk index and the lowest stripe index of the block;
establishing consecutive diagonal parity sets by diagonally grouping the data strips adjacent to the previously established diagonal parity set until each data strip has been assembled into a diagonal parity set without wrapping around the array; and
grouping the established sets in the first diagonal direction into a first group.

16. The system of claim 15, wherein the array controller is further configured for arranging strips containing data into diagonal parity sets, for respective blocks by:
establishing an initial diagonal parity set in a second diagonal direction as a data strip having the highest disk index of a disk storing data and the lowest stripe index of the block;
establishing consecutive diagonal parity sets by diagonally grouping the data strips adjacent to the previously established diagonal parity set until each data strip has been assembled into a diagonal parity set without wrapping around the array; and
grouping the established sets in the second diagonal direction into a second group so that each data strip is a member of the first and second group.

17. The system of claim 12, wherein the array controller is further configured, for respective blocks, to reconstitute lost data on simultaneously failed disks by using the corresponding parity and data stored in the chunks on the remaining intact disks of the array.

* * * * *